M. C. RYPINSKI.
ELECTRICAL MEASURING INSTRUMENT.
APPLICATION FILED NOV. 15, 1907.

985,456. Patented Feb. 28, 1911.

WITNESSES:
C. L. Belcher
Otto J. Schainer

INVENTOR
Maurice C. Rypinski
BY
ATTORNEY IN FACT.

UNITED STATES PATENT OFFICE.

MAURICE C. RYPINSKI, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

ELECTRICAL MEASURING INSTRUMENT.

985,456.  Specification of Letters Patent.  Patented Feb. 28, 1911.

Application filed November 15, 1907. Serial No. 402,275.

*To all whom it may concern:*

Be it known that I, MAURICE C. RYPINSKI, a citizen of the United States, and a resident of Pittsburg, in the county of Allegheny and State of Pennsylvania, have invented a new and useful Improvement in Electrical Measuring Instruments, of which the following is a specification.

My invention relates to electrical measuring instruments, and it has for its object to provide certain simple, reliable and inexpensive structural elements that may be readily and accurately assembled to produce an inexpensive instrument which shall be more satisfactory in operation than instruments of the same general character heretofore produced.

Figure 1:
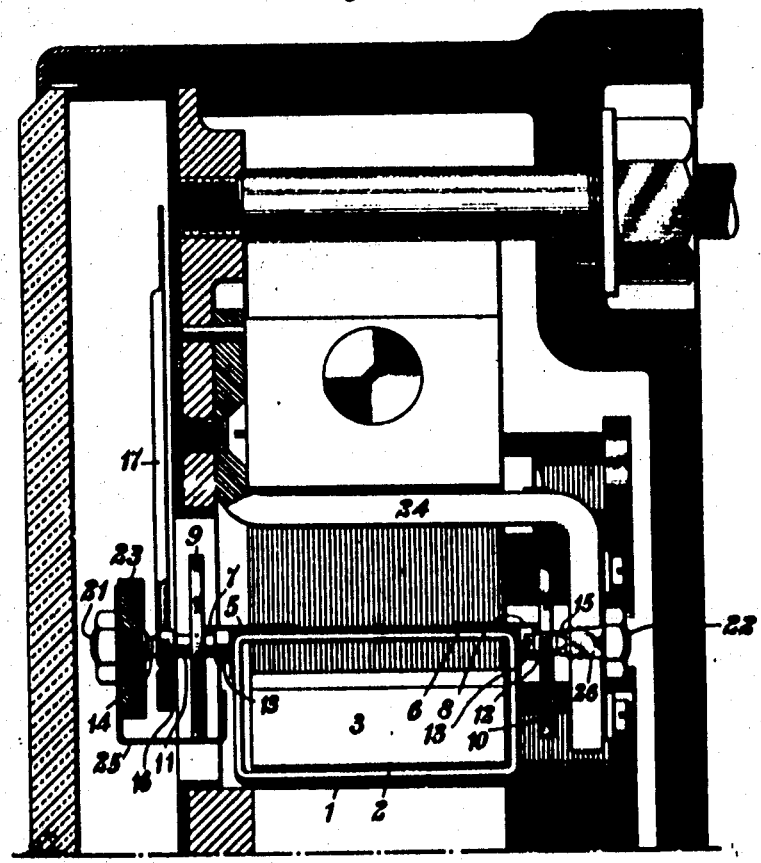
Figure 2:
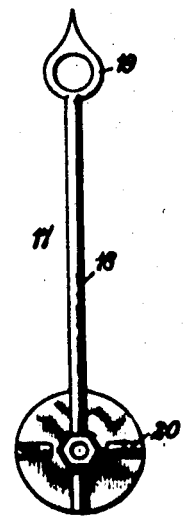
Figure 3:
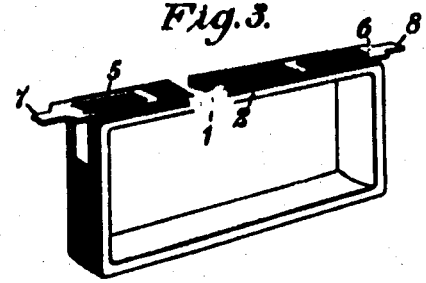

Figure 1 of the accompanying drawing is a view, in transverse section, of a portion of an instrument embodying my invention. Fig. 2 is a face view of the movable pointer of the instrument, and Fig. 3 is a perspective view of some of the movable parts of the instrument.

The instrument comprises a movable coil 1 wound upon a substantially rectangular frame or bobbin 2 that is threaded upon a pole piece 3 of a permanent magnet constituting the stationary element of the instrument. The movable coil and its bobbin are supported by means of two substantially T-shaped brackets 5 and 6 two legs of each of which embrace the sides of the coil and are cemented or otherwise secured thereto, though insulated therefrom, the remaining legs 7 and 8 extending outwardly from the coil in alinement with each other. The brackets 5 and 6 are connected, respectively, to the terminals of the coil 1, and the free ends of the outwardly extending legs 7 and 8 thereof are secured to the inner ends of two spiral springs 9 and 10, whereby a torque is opposed to that exerted upon the movable coil 1 during operation of the instrument, and current is conducted to and from the movable coil.

Soldered, or otherwise secured in the outer angles of the brackets 5 and 6, are two posts 11 and 12 having, at their inner ends, heads 13 of hexagonal or other suitable form the straight sides of which are placed against the outwardly extending legs 7 and 8 of the brackets, pointed pivot-pins 14 and 15 being screw-threaded in the outer ends of the posts. The outer end of the post 11 is provided with a head 16 of hexagonal or other suitable form that projects into a correspondingly shaped recess or seat in the base of a pointer 17 that is punched and formed from a piece of sheet material, the pivot-pin 14 serving to secure the base of the pointer to the post 11.

The pointer 17 comprises a channel or other suitably-shaped arm 18 having a target or index 19 at its outer end, the base thereof being provided with recesses 20 for the reception of Babbitt metal or other suitable material for balancing the pointer.

Bearings for the pivot-pins 14 and 15 are provided in the ends of screws 21 and 22 that are threaded through stationary brackets 23 and 24 from which arms 25 and 26 extend inwardly to provide means for stationarily securing the outer ends of the springs 9 and 10.

It will be seen that the movable system of the instrument may be readily and accurately assembled without the use of jigs and similar devices, since the structure and arrangement of the parts are such that the pivot-pins, and the pointer will occupy correct and definite positions with respect to the movable coil if the parts are merely secured together, as shown. The manufacture of the instrument is, therefore, greatly facilitated and rendered quite inexpensive.

I claim as my invention:

1. An instrument pointer formed from sheet material and comprising a channel-shaped index-carrying arm, and a base having a seat or recess in one side to receive a supporting member, and recesses in said base to receive material for balancing the pointer.

2. In a measuring instrument, the combination with a substantially rectangular movable coil, of T-shaped brackets two legs of each of which embrace and are secured to the coil, and posts secured to the brackets and provided with pivot-pins and with alining surfaces seated against the remaining legs of the brackets.

3. In a measuring instrument, the combination with a movable coil and supporting brackets therefor connected to the terminals thereof and having outwardly extending arms, of pivot-pins carried by the brackets, and springs to which the said outwardly extending arms are connected.

4. In a measuring instrument, the combination with a movable coil, and supporting brackets therefor having outwardly extending arms, of posts carrying pivot-pins and secured to the brackets, and having alining surfaces seated against the said outwardly extending arms.

5. In a measuring instrument, the combination with a movable coil having angle brackets secured to its ends, of outwardly projecting posts which have polygonal heads secured to said brackets and one of which has a polygonal outer end, a pointer having a polygonal recess in which said post-end is seated, and pivot-pins screwed into the outer ends of said posts, one of which serves to secure the pointer to its supporting post.

6. In a measuring instrument, the combination with a rectangular movable coil having angle brackets secured to its upper corners, of outwardly projecting posts which have polygonal heads secured in the angles of said brackets and one of which has a polygonal outer end, a pointer having a polygonal recess in which said post-end is seated, and pivot-pins screwed into the outer ends of said posts, one of which serves to secure the pointer to its supporting post.

In testimony whereof, I have hereunto subscribed my name this 7th day of November, 1907.

MAURICE C. RYPINSKI.

Witnesses:
WM. BRADSHAW,
BIRNEY HINES.